Figure 1:
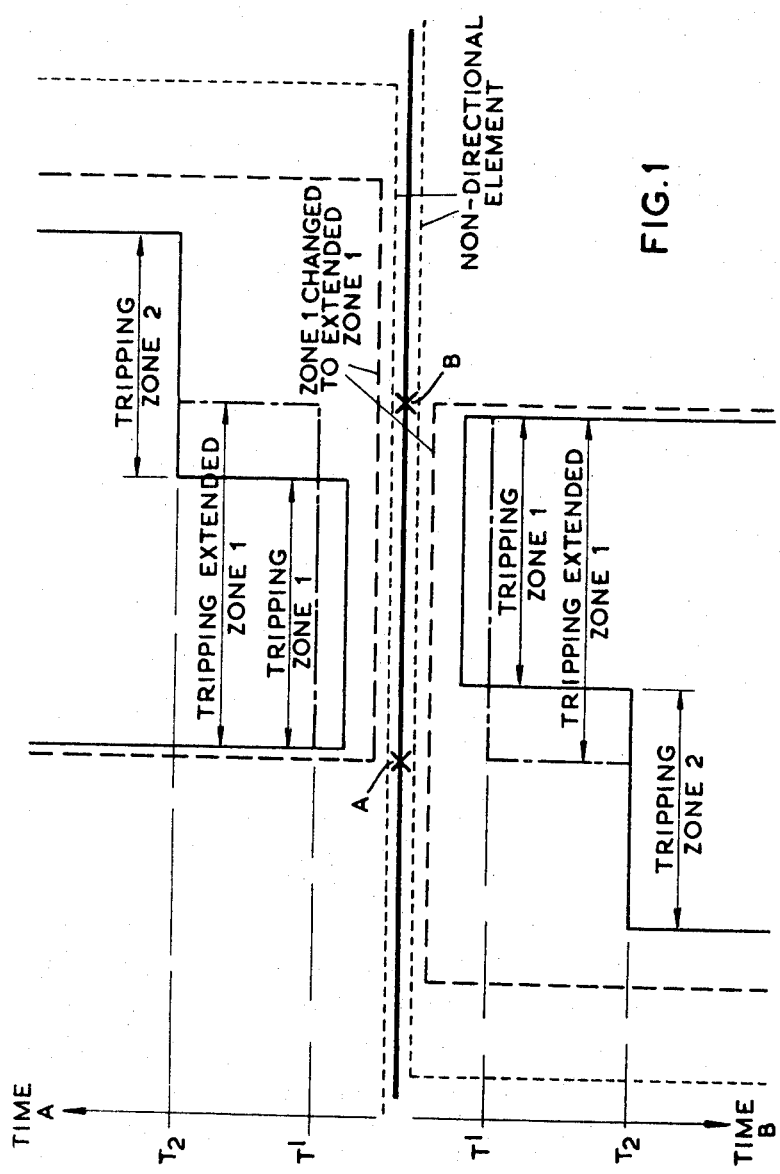

April 23, 1968        H. HOEL        3,379,936

PROTECTIVE DISTANCE RELAY SYSTEM FOR POWER TRANSMISSION LINES

Filed Feb. 26, 1965        2 Sheets-Sheet 1

United States Patent Office 3,379,936
Patented Apr. 23, 1968

3,379,936
PROTECTIVE DISTANCE RELAY SYSTEM FOR POWER TRANSMISSION LINES
Hans Hoel, Oslo, Norway, assignor to The English Electric Company Limited, London, England, a British company
Filed Feb. 26, 1965, Ser. No. 435,598
Claims priority, application Great Britain, Mar. 2, 1964, 8,628/64
7 Claims. (Cl. 317—36)

The invention relates to electrical protective equipment.

According to the invention such an equipment comprises two electrical protective devices each arranged for use so as to be responsive to electrical signals from a respective one of the two ends of the section, each device including a first element responsive to the electrical signals from the respective one of the ends of the section for producing an intermediate signal in response to a fault being detected in a respective first portion of the power system which includes at least all the section, a second element responsive to the electrical signals for producing, when rendered operative, a control signal in response to a fault being detected in a second portion of the power system which extends from the respective end of the section and includes at least all of the said section, and means for rendering operative the second element in each device on receipt of the said intermediate signal from the first element of the other device, whereby production of the said control signal from both the said second elements simultaneously indicates a fault within the section.

According to a feature of the invention in such equipment each device includes a third element responsive to simultaneous receipt of said control signals from the second elements in both devices for producing a first output signal.

According to another feature of the invention in such equipment each of the said second elements is also rendered operative to produce after a first predetermined time delay a second output signal in response to a fault being detected in a third portion of the power system which extends on the respective end of the section of a point in the power system within the section, the first predetermined time delay being such that normally the first output signal is produced before the second output signal the second output signal being indicative of a fault within the said third portion.

According to another feature of the invention in such equipment each of the said second elements is also rendered operative to produce after a second predetermined time delay a third output signal in response to a fault being detected in a fourth portion of the power system which extends from the respective end of the section to a point in the power section beyond the other end of the said section, the second predetermined time delay being normally greater than the said first predetermined time delay, the other output signal being indicative of a fault within the said fourth portion.

According to another feature of the invention a respective circuit breaker is associated with each of the said protective devices and operative in response to the receipt of a said output signal from the associated device to disconnect the respective end of the section from the system.

According to another feature of the invention such equipment includes an electrical protective device responsive in use to the electrical signals from one end of a section of a power system comprising a first element responsive to the electrical signals for producing an intermediate signal in response to a fault being detected in a first portion of the power system which includes at least all the section, a second element responsive to the electrical signals for producing, when rendered operative, a control signal in response to a fault being detected in the second portion of the power system which extends from the said end of the section and includes at least all the said section, and means for rendering the second element operative in the device on receipt of an intermediate signal from the first element of another similar device, responsive to the electrical signals from the other end of the section, including a third element responsive to simultaneous receipt of said control signals from the second element of the device and the said similar device for producing a first output signal.

According to another feature of the invention in the electrical protective device the second element is also rendered operative after a first predetermined time delay to produce a second output signal in response to a fault being detected in a third portion of the power system which extends from the said end of the section to a point in the power system within the section, the first predetermined time delay being such that normally the first output signal is produced before the second output signal, a second output signal being indicative of a fault within the said third portion.

According to another feature of the invention in the electrical protective device the second element operates by comparing the said electrical signals with an adjustable reference, the value of the reference determining the length of the portion within which faults are detected.

According to another feature of the invention the value of the reference signal is normally such that the portion within which voltages are detected is the third portion and is adjusted on receipt of an intermediate signal from the said similar device to a value such that the portion within which the voltages are detected is the second portion.

Figure 2:
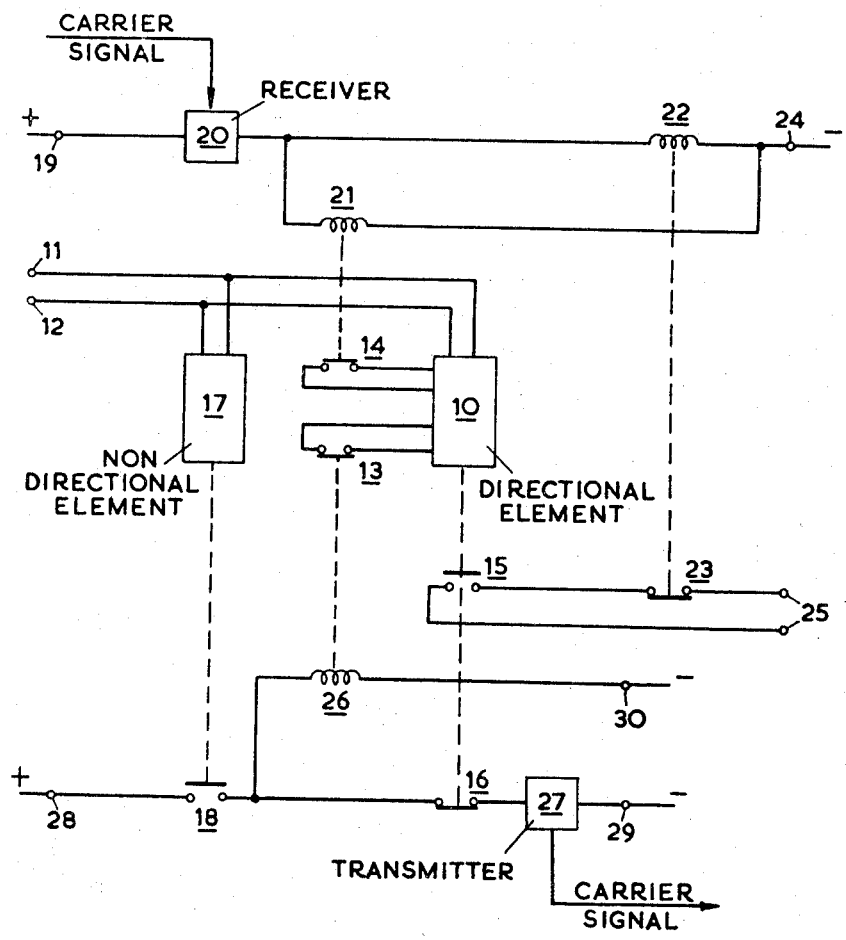

An electrical protective distance relay according to the invention and a protection scheme in which carrier signalling is used between relays will now be described by way of example and with reference to the accompanying drawings in which:

FIG. 1 shows a time-impedance diagram of the relay at A and a similar associated relay at B in a section AB of an electrical system to be protected by the relays, and FIG. 2 shows diagrammatically the relay and its associated circuit.

Referring now to the drawings, in FIG. 1 relay characteristics comprise a zone one of the relay at A which corresponds to about 90% of the distance of the section AB from A and a zone two which extends from A into the next section beyond B. On extension zone one is arranged to extend from A beyond the zone two, and a fast-acting non-directional element of the relay is arranged to extend from A in both directions and beyond the extended zone one as shown. The associated relay at B has a characteristic as shown below the line AB as seen in the FIG. 1.

In FIG. 2, a directional element 10 has input terminals 11 and 12 for receiving signals respectively dependent on a current and a voltage in the section AB to be protected by the relay. The element 10 is influenced by the opening of normally-closed contacts 13 to extend its reach from the zone one to zone two and by opening of normally-closed contacts 14 to extend its reach from zone one to extended zone one. Normally-open contacts 15 and normally-closed contacts 16 are mechanically linked and controlled by the element 10. The fast-acting non-directional element 17 having input terminals 11 and 12 is associated with normally-open contacts 18.

breaker switch to complete an auxiliary circuit for tripping said circuit breaker, said breaker being inhibited from tripping by said circuit means upon said further switch being opened thereby and uninhibited upon said further switch being closed.

3. A relay system according to claim 2, comprising first and second auxiliary switches, and wherein said control signal is a carrier or radio signal transmitted in response to a circuit being completed through said first and second series-connected auxiliary switches, said first switch being closed upon said non-directional element detecting a fault and said second switch being opened upon said directional element detecting a fault.

4. A relay system according to claim 3, wherein said directional element is operative to detect faults within said initial zone and at least one further, greater, zone, said directional element comprising first and second pairs of contacts normally operative to assume one position to cover said initial zone, the first pair of contacts assuming another position in response to the receipt of said control signal whereby to detect faults within said extended initial zone, and said further zone being covered in response to said second pair of contacts assuming another position a predetermined period after said non-directional element has detected a fault.

5. A relay system according to claim 4, wherein said initial zone of each relay extends over a major portion of said section and all the further zones together extend beyond the section, the extended initial zone extending over a distance at least equal to that covered by said further zones.

6. A protective relay system comprising first and second distance relays connected to opposite ends of a section of power line and each operative to actuate a switch for tripping a line circuit breaker adjacent its end of the section, each relay including a non-directional element for transmitting a carrier signal to the other relay upon a fault occurring within a distance which embraces all of a number of contiguous zones of protection extending from both relays, the zones of each relay being unidirectional and together extending over the whole of said section, circuit means at each relay for both extending an initial zone of the relay which normally extends over a major portion of the section and inhibiting said breaker from tripping upon receipt of said signal by that relay, the extension of said initial zone embracng all the zones of that relay, and a directional element in each relay for both interrupting the transmission of said signal and actuating said switch upon detection by that relay of a fault within any of its zones of protection, the arrangement being such that said interruption of transmission at one relay uninhibits the breaker at the other relay whereby to permit said directional element of said other relay to cause its breaker to trip upon detection of a fault in any of its zones.

7. A protective relay system comprising two distance relays connected to opposite ends of a section of power line and each operative to actuate a switch for tripping a line circuit-breaker adjacent its end of the section, each relay comprising, a non-directional element for transmitting a control signal to the other relay upon a fault occurring within a distance which embraces all of a number of zones of protection extending from both relays, the zones of each relay being unidirectional and together extending over the whole of said section, a directional element operative to interrupt transmission of said control signal from that relay and selectively to reach over an initial zone and at least one further, greater, zone, whereby to actuate said switch in response to a fault condition, the directional element comprising first and second pairs of contacts normally operative to assume one position in which said element reaches over its initial zone, said first contacts being operative to assume another position to extend the reach of said initial zone and said second contacts being operative to assume another position in which said element reaches over its further zone a predetermined period after its operation, and circuit means operative upon receipt of said control signal at that relay to both cause the first contacts of the directional element to assume their other position and inhibit the breaker at that relay from tripping, the interruption of transmission effected by said directional element at one relay uninhibiting the breaker at the other relay whereby to permit the directional element of that relay to trip its breaker upon detection of a said fault condition in any of its zones of protection.

References Cited
UNITED STATES PATENTS

| | | | |
|---|---|---|---|
| 2,879,454 | 3/1959 | Hodges et al. | 317—36 X |
| 3,201,651 | 8/1965 | Calhoun | 317—36 |

MILTON O. HIRSHFIELD, *Primary Examiner.*

J. D. TRAMMEL, *Assistant Examiner.*